2,917,414

ELECTRICAL CONDUCTORS COATED WITH TITANATE-MODIFIED ALKYD RESINS

William M. McLean, Midland, Mich., assignor to Dow Corning Corporation, Midland, Mich., a corporation of Michigan No Drawing. Application November 21, 1955
Serial No. 548,270

6 Claims. (Cl. 117—221)

This invention relates to electrical conductors coated with modified alkyd resins.

The discovery of the usefulness of terephthalic and isophthalic alkyd resins for coating electrical conductors has led to a significant advancement in the magnet wire art. These alkyd resins show improved thermal stability over prior organic magnet wire enamels. Furthermore they have the requisite physical properties and solvent resistance to meet the stringent requirements of a successful magnet wire enamel. Resins of this type are fully described in U.S. Patents 2,686,739 and 2,686,740. Because of their improved properties, namely the combination of relatively good thermal stability and other desirable physical properties, these materials have obtained commercial success for use in coating electrical conductors both as magnet wire enamels and as dipping varnishes.

However, full commercial exploitation of the terephthalic and isophthalic type of alkyd resin for insulating electrical conductors has been hampered by the difficulty which is often encountered in coating these materials onto wire. This difficulty is encountered both in dip coating and in die coating but is much more pronounced in the latter method. The difficulty is evidenced by uneven coats on the wire which give a rough finish and unreliable dielectric strength due to thin spots in the film. The cause of this difficulty is not fully understood but seems to be due to some inherent property in the terephthalic and isophthalic alkyds. This difficulty is encountered both with the unmodified alkyds and those which have been modified by the addition of organosilicon compounds or fatty acids or both. It also appears to be true of the alkyl resins which are modified by other types of organic resins such as phenol formaldehyde resins and polyvinyl acetal resins. Consequently in spite of the desirable properties of terephthalic and isophthalic alkyds their commercial exploitation has been seriously hampered by the coating difficulties.

It is the primary object of this invention to provide terephthalic and isophthalic alkyd resins which coat well on electrical conductors and which retain all of the desirable properties of the previously known terephthalic and isophthalic alkyd resins. Another object is to obtain this improvement with all types of terephthalic and isophthalic alkyd resins. Other objects and advantages will be apparent from the following description.

This invention relates to an article of manufacture comprising an electrical conductor coated with a cured composition comprising (1) a condensation product of a polyhydric alcohol, at least some of which alcohol is at least trihydric and a compound of the group terephthalic and isophthalic acids and lower alkyl esters thereof, said condensation product containing from .001-3% by weight titanium added as (2) a titanium compound of the group alkanol amine titanates, alkanol amine titanate N salts, compounds of the formula Ti(OR)$_4$ in which R is of the group monovalent hydrocarbon radicals, hydroxylated monovalent hydrocarbon radicals, carboxylated monovalent hydrocarbon radicals and acyl radicals of the formula

in which R' is an aliphatic hydrocarbon radical and partial condensates of said titanium compound (2).

The compositions of this invention may be prepared by merely cold blending the defined titanium compounds with the alkyd resin (1). The finished composition is diluted to a satisfactory coating viscosity with suitable solvents such as hydrocarbons, ketones, ethers, esters and phenols and thereafter applied to the wire by conventional coating means and then cured in any desirable manner such as by passing through a heated tower. Thus it can be seen that the compositions of this invention are adaptable to conventional application techniques.

The titanium compounds which are operative in this invention include any titanium tetrahydrocarbonoxy compound such as methyl titanate, ethyl titanate, butyl titanate, octyl titanate, isopropyl titanate, 2-ethylhexyl titanate and octadecyl titanate, vinyl titanate, allyl titanate, phenyl titanate, tolyl titanate and cyclohexyl titanate; any hydroxylated hydrocarbonoxy titanate such as octylene glycol titanate, ethylene glycol titanate, glycerol titanate, propylene glycol titanate and resorcinyl titanate; any carboxylated hydrocarbonoxy titanate such as lactyl titanate, glycolyl titanate and β-hydroxy butyryl titanate; any acyl titanate wherein the acyl radical has the formula

where R' is any aliphatic hydrocarbon radical such as butyl, hexyl, stearyl, oleyl, linoleyl, linolenyl, ricinoleyl, palmityl and lauryl and any alkanol amine titanate such as monoethanol amine titanate, diethanol amine titanate, propanol amine titanate, butanol amine titanate, octadecanol amine titanate and N salts of such alkanol amine titanates such as triethanol amine-N-oleate titanate, triethanol amine-N-stearate titanate, triethanol amine-N-linoleate titanate, diethanol amine-N-linolenate titanate, propanol amine-N-acetate titanate, butanol amine-N-octoate titanate and triethanol amine-N-palmitate titanate.

In addition the titanium compounds employed in this invention can be any organic solvent soluble partial condensate of any of the above titanium compounds. The partial condensates are characterized by the fact that they have TiOTi linkages in the molecule. In other words they are polymeric materials and may be represented by formulas such as

(YO)$_3$TiOTi(OY)$_3$ and

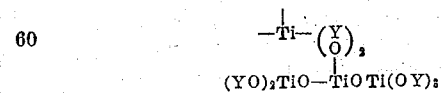

in which Y represents any of the organic radicals shown above. Some of the Y's can be hydrogen. These partial condensates can be prepared by partially hydrolyzing the orthotitanates of the formula Ti(OY)$_4$.

It should be understood that in all of the titanium compounds employed herein the various Y groups attached to any one titanium atom can be the same organic radical or they can be different organic radicals. Thus, mixed titanates such as diethyldimethyltitanate, bis-triethanol amine dipropyl titanate, tris-octylene glycol monobutyl titanate and partial condensates of the formula

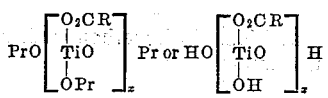

where R is a stearyl, are also operative in this invention. One can also use mixtures of the various titanates.

It is believed that those titanium compounds having alkanol amine, glycol and hydroxy acid groups, form chelates by the formation of secondary or coordination bonds between the N, OH and COOH groups respectively and the Ti atom. These compounds would have structures such as for example

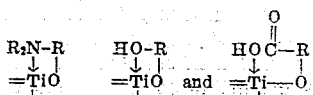

As many as two such secondary bonds (indicated by→) can be formed with any one Ti atom.

The basic alkyd resin in the compositions of this invention is a condensation product of a polyhydric alcohol in which at least some of the alcohol units are at least trihydric and terephthalic or isophthalic acids or their lower alkyl esters. These resins are prepared in the conventional manner for making alkyd resins.

The alcohols which can be employed in this invention include glycerine, pentaerythritol, trimethylol ethane, trimethylol propane, triethanol amine and any other trihydric or tetrahydric alcohols. In addition the alcohols can consist of limited amounts of dihydric alcohols such as ethylene glycol, propylene glycol, octylene glycol and diethanol amine. In general it is preferred that the dihydric alcohols be present in amount less than 50% by weight of the total polyhydric alcohol in the alkyd resin.

The essential acids employed in the formulation of the materials of this invention are terephthalic and isophthalic acids and their lower alkyl esters such as dimethyl terephthalate, diethylisophthalate, diisopropylterephthalate, methylethylterephthalate and dioctylterephthalate.

If desired, minor amounts of aliphatic dibasic acids such as maleic acid, malonic acid, adipic acid, sebacic acid, cyclohexyldicarboxylic acid or their anhydrides and esters may be employed.

If desired the alkyd resins employed in the coatings of this invention may be modified with up to 75% by weight of an organosilicon compound of the formula $$R''_nSiX_mO_{\frac{4-n-m}{2}}$$

in which R'' is a monovalent hydrocarbon radical, X is a functional radical of the group halogen atoms, alkoxy radicals, silicon bonded hydroxyl radicals, hydroxylated monovalent hydrocarbon radicals, and radicals of the formula ZOOCB— in which Z is of the group hydrogen and lower alkyl radicals and B is a divalent hydrocarbon radical, n has an average value from 1–3 inclusive and m has an average value from .01–3 inclusive.

The term "functional group" as used herein means that the group is capable of reacting with the OH, COOH or COOAlk groups in the alkyd resin whereby the organosilicon compound is chemically linked to the alkyd molecules. When the reaction takes place through halogen, alkoxy or silanol OH groups the silicon compound is linked to the alkyd by SiOC (i.e. silicon ester) linkages. When reaction takes place through hydroxylate hydrocarbon radicals or radicals of the type ZOOCB—, the silicon compounds is linked to the alkyd through

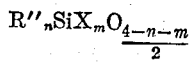

(i.e. organic ester) linkages. In the latter case it is not necessary that the silicon compound contain any halogen, alkoxy or silanol OH groups. However, these may be present if desired, in which case the silicon compound will be linked to the alkyd by both

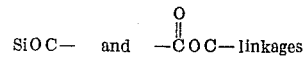

The organosilicon compounds can be reacted with the condensation product of the polyhydric alcohol and the terephthalic and isophthalic acid at any stage of the preparation of these alkyd resins. That is, the organosilicon compound may be first reacted with the alcohol which is subsequently reacted with the acid or the alcohol and the acid may be reacted first and the organosilicon compound thereafter reacted with the residue.

It can be seen from the formula that the organosilicon compounds which can be employed in the resins of this invention can be either monomeric materials such as halosilanes, alkoxysilanes or silanols or polymeric materials, namely siloxanes which contain some X groups. These siloxanes can be either partially condensed (i.e. contain some residual silanol OH) or they can be completely condensed (i.e. contain no SiOH groups). The preparation of such siloxanes is well known in the art. It can also be seen that any one silicon atom may have from 1 to 3 nonhydrolyzable organic radicals attached thereto and that the organosilicon compound can be a mixture or a copolymer containing silicon atoms having varying numbers of nonhydrolyzable organic radicals attached thereto. In all cases the total number of R groups and X groups on any one silicon atom cannot exceed 4.

Specific examples of operative organosilicon compounds which may be employed in the compositions of this invention are dimethyldichlorosilane, dibutyldiisopropoxysilane, phenylmethyldiethoxysilane, divinyldibutoxysilane, tolyltriethoxysilane, cyclohexyltrimethoxysilane, phenylmethyldibromosilane, stearylmethyldiethoxysilane, allylstearyloxydimethoxysilane, diphenylsilane diol, phenylmethylsilane diol, octadecylmethylsilane diol, bis-gammahydroxypropyldimethylsilane, gammahydroxypropylphenyldimethoxysilane, carboxyphenylmethyldimethoxysilane and

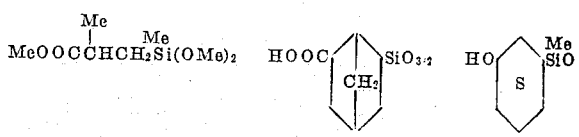

copolymers of PhMeSiO and

and mixtures thereof. It is to be understood that the foregoing list is merely representative of the organosilicon compounds operable in this invention and is not a complete and exclusive listing.

In addition to being modified by organosilicon compounds the alkyd resins employed in this invention may also be modified by fatty acids. When employed the fatty acids are used in amount of less than 75% by weight, preferably less than 35% by weight of the polyhydric alcohol terephthalic or isophthalic condensation product.

Specific examples of fatty acids which may be employed herein include acetic acid, propionic acid, octonoic acid, capric acid, lauric acid, myristic acid, palmitic acid, stearic acid, behinic acid, oleic acid, erucic acid, ricinoleic acid, linoleic acid, linolenic acid and arachidonic acid. It should be understood of course that these acids may be employed per se or as the glyceride.

The fatty acid modification may be employed in conjunction with the organosilicon modification or in lieu thereof.

When modified alkyd resins are employed in this invention the composition of the coating on the electrical conductor is as follows:

(1) The reaction product of:
  (a) From 25–100% by weight of the condensation product of a polyhydric alcohol and terephthalic and isophthalic acids or their lower alkyl esters,
  (b) From 0–75% by weight of the defined organosilicon compounds and
  (c) From 0–75% by weight of the defined fatty acids, said reaction product containing from .001–3% by weight titanium added as
(2) The defined titanium compounds.

In addition to the primary modifications stated above the alkyd resins employed in this invention may also be modified with phenolaldehyde resins, polyvinylacetal resins, epoxy resins or other organic resins suitable for coating. When such modifications are employed the amount of organosilicon compound and fatty acid modification if any is reduced proportionately.

The compositions employed in this invention can be applied to the electrical conductors by any of the conventional coating techniques. The particular advantage of the compositions of this invention is apparent from the ease with which the resins are die coated onto all shapes of copper or other types of wire. The coatings are of uniform thickness and show no evidence of delamination of the successive layers. The resulting coatings have all of the desirable physical and chemical properties of the heretofore employed terephthalic and isophthalic alkyd resins. Consequently the compositions of this invention represent a significant advance in the electrical coating art particularly with respect to magnet wire enamels.

The following examples are illustrative only and should not be construed as limiting the invention which is properly delineated in the appended claims. All parts are parts by weight.

*Example 1*

Th alkyd resin in the procedure of this example was prepared by reacting 369 parts glycerine, 140 parts ethylene glycol, 75 parts triethanol amine, 1164 parts dimethylterephthalate, 18 parts of a partially hydrolyzed phenylmethyldimethoxysilane containing 30% by weight methoxy groups, in the presence of 140 parts of isophorone and 6 parts of magnesium acetate. The mixture was heated 17 hours at a temperature up to 240° C. during which time methanol was removed and the viscosity of the mixture increased to the desired point. The resulting product was then diluted to 25% by weight solids by the addition of a mixture of alkylated phenols wherein the alkyl groups on the phenol were methyl, ethyl and butyl.

600 g. of this solution was mixed with 6 g. of tetrabutyl titanate. The titanate was added as a 10% solution in the mixed alkylated phenols. 140 g. more of the mixed alkylated phenols was then added. The resulting solution was employed to die coat No. 18 copper wire. The wire was passed through the solution and then through the die and then through the tower where the temperature ranged up to 515° C. The wire was passed through the solution and the tower at a speed of 30 feet per minute. Six coatings were applied in this manner. The resulting wire had a smooth, uniform coat which was completely satisfactory for commercial use.

In an identical process employing the identical composition except for the titanate, the wire obtained had a wavy, rough coating which gave undesirable electrical properties and was not satisfactory for commercial use in electrical apparatus.

*Example 2*

The process of Example 1 was repeated employing 5% by weight octyl titanate based on the weight of the silicone modified alkyd resin. The resulting product gave results equivalent to those obtained in Example 1.

*Example 3*

Equivalent results were obtained when 5% of a titanate having two octylene glycol units and two butoxy groups attached to each titanium atom was employed in the procedure of Example 1.

*Example 4*

Butyl titanate was mixed with a mixture of alkylated phenols in which the phenol groups had methyl, ethyl and propyl groups attached to the phenyl ring. The mixture was heated until the theoretical amount of butanol was removed. The resulting product was an orthotitanate having the alkylated phenoxy groups attached to the titanium atom. 5% by weight of this material was mixed with the compositions of Example 1 and thereafter coated on wire in an identical manner. Equivalent results were obtained.

*Example 5*

The alkyd resin employed in this example was prepared by reacting 370 parts of glycerine, 184 parts ethylene glycol and 1164 parts dimethyl terephthalate in the presence of 140 parts of isophorone and 6 parts of magnesium acetate. The reaction was carried out by heating the mixture for 13 hours at a temperature up to 240° C. The reaction mixture was diluted with the alkylated phenol mixture of Example 1 to give a 30% by weight solution of the alkyd resin.

To 600 g. of this solution was added 9 g. of triethanol amine titanate having 2 triethanol amine groups per Ti atom. The mixture was diluted with 300 g. more of the alkylated phenols and was then coated on No. 18 copper wire by the process of Example 1. The coating on the wire was vastly improved over the coating obtained by using the same alkyd resin unmodified with the titanate.

*Example 6*

The alkyd resin employed in this example was made by reacting 552 parts glycerine, 186 parts ethylene glycol, 1552 parts dimethyl terephthalate and 400 parts of phenylmethyldimethoxysilane, in the presence of 226 parts of isophorone in 6 parts magnesium acetate. The mixture was reacted by heating 19 hours at a temperature up to 233° C. It was thereafter diluted with cresole to a 40% by weight solution.

To 600 g. of this solution was added 48 g. of triethanol amine titanate having two triethanol amine groups per Ti atom. Copper wire was then coated with this mixture in accordance with the method of Example 1 and an excellent smooth coating was obtained. This coating was much superior to that obtained by employing the silicone alkyd resin without the titanate.

*Example 7*

Equivalent results are obtained when 5% by weight based on the weight of the alkyd resin of the compound

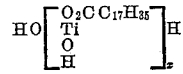

is employed in the place of the ethanol amine titanate of Example 5.

*Example 8*

The resin employed in this example was prepared by heating 46 parts of glycerin and 105 parts of isophthalic acid in 200 parts of butyl Carbitol acetate at 240° C. with stirring for 2½ hours.

When 5% by weight of butyl titanate based on the weight of the alkyd resin, is added to this mixture, improved coating of copper wire is obtained.

*Example 9*

72.4 parts of pentaerythritol, 148 parts of terephthalic acid, 70 parts of linseed oil fatty acid and 200 parts of butyl Carbitol acetate were mixed and heated at 260° C. for 7 hours.

When 5% by weight butyl titanate based on the weight of the alkyd resin is added to this mixture, an improved coating composition is obtained.

*Example 10*

When 98 parts glycerine, 388 parts dimethyl terephthalate and 180 parts of hydroxypropylphenylsiloxane are reacted in the presence of 140 parts of isophorone and 6 parts of magnesium acetate for 17 hours at a temperature up to 240° C. and the resulting product is then diluted to 25% solids in mixed alkyl phenols and 5% by weight butyl titanate based upon the weight of the silicone alkyd resin is then added, the resulting product coats well on copper wire in accordance with the process of Example 1.

*Example 11*

When 98 parts of glycerine, 194 parts of dimethyl terephthalate, 160 parts of

MeOOCCHCH₂SiO are reacted in accordance with the method of Example 10 and 5% by weight of butyl titanate based on the weight of the silicone alkyd is then added to the product, the resulting material gives excellent coating on copper wire.

*Example 12*

A mixture of 46 parts of glycerine, 84.6 parts of terephthalic acid, 71 parts of linseed oil fatty acid and 100 parts of butyl Carbitol acetate was heated 2 hours at 260° C. The reaction mixture was cooled and 20 parts of phenyltriethoxysilane was added. The mixture was agitated and heated 1 hour at 260° C. as ethanol was removed.

When 5% by weight butyl titanate based on the weight of the alkyd resin is added to this mixture the resulting product coats satisfactorily on copper wire.

*Example 13*

Equivalent results are obtained when 10% by weight of triethanol amine-N-stearate titanate having the average formula of two triethanol amine groups and one N stearic acid group per Ti atom is employed in the procedure of Example 5.

*Example 14*

Equivalent results are obtained when a lactyl butyl titanate of the formula

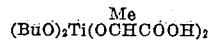
(BuO)₂Ti(OCHCOOH)₂ is employed in amount of 10% by weight based on the weight of the alkyd resin in the procedure of Example 5.

*Example 15*

92 parts of glycerin, 166 parts of terephthalic acid, 142 parts of linseed fatty acid and 400 parts of isophorone were mixed and heated at 214 to 225° C. for 11 hours. The mixture was cooled to 180° C. and 638 parts of a siloxane copolymer of the composition 33⅓ mol percent each of phenylmethylsiloxane, monophenylsiloxane and monomethylsiloxane, which copolymer contained 1.89 weight percent silicon bonded OH groups, was added as a 70 weight percent toluene solution. Heating was contained at 160–180° C. for 5 hours during which time 150 parts of isophorone, 200 parts of cresylic acid and 100 parts of dimethylformamide were added as additional solvent.

When 5% by weight butyl titanate, based on the weight of the alkyd resin is added to this solution and the product is coated on copper wire in accordance with Example 1, an improved coating is obtained.

That which is claimed is:

1. An article of manufacture comprising an electrical conductor coated with a cured composition comprising (1) a condensation product of a polyhydric alcohol, at least some of which alcohol is at least trihydric and a compound of the group consisting of terephthalic and isophthalic acids and the lower alkyl esters thereof, said condensation product containing from .001–3% by weight titanium added as (2) a titanium compound selected from the group consisting of alkanol amine titanates, alkanol amine titanate N salts, compounds of the formula Ti(OR)₄ in which R is of the group monovalent hydrocarbon radicals, hydroxylated monovalent hydrocarbon radicals, carboxylated monovalent hydrocarbon radicals and acyl radicals of the formula

$$-\overset{O}{\underset{}{\overset{\|}{C}}}R'$$

in which R' is an aliphatic hydrocarbon radical and organic solvent soluble partial condensates of said titanium compound (2).

2. An article of manufacture comprising an electrical conductor on which the cured coating comprises:
   (1) A condensation product of:
      (a) At least 25% by weight of the reaction product of a polyhydric alcohol, at least some of which alcohol being at least trihydric, and a compound of the group consisting of terephthalic and isophthalic acids and lower alkyl esters thereof,
      (b) Up to 75% by weight of an organosilicon compound of the formula

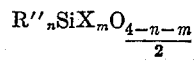
$$R''_nSiX_mO_{\frac{4-n-m}{2}}$$

in which R'' is a monovalent hydrocarbon radical, X is selected from the group consisting of halogen atoms, alkoxy radicals and silicon bonded hydroxyl radicals, hydroxylated monovalent hydrocarbon radicals and radicals of the formula ZOOCB— in which Z is of the group consisting of hydrogen and lower alkyl radicals and B is a divalent hydrocarbon radical, n has an average value from 1–3 inclusive and m has an average value from .01–3 inclusive and
      (c) Up to 75% by weight of a fatty acid, said condensation product (1) containing from .001–3% by weight of titanium added as
   (2) A titanium compound of the group consisting of alkanol amine titanates, alkanol amine titanate N salts, compounds of the formula Ti(OR)₄ in which R is of the group consisting of monovalent hydrocarbon radicals, hydroxylated monovalent hydrocarbon radicals, carboxylated monovalent hydrocarbon radicals and acyl radicals of the formula

$$-\overset{O}{\underset{}{\overset{\|}{C}}}R'$$

in which R' is an aliphatic hydrocarbon radical and organic solvent soluble partial condensates of said titanium compound (2).

3. An electrical conductor ocated with a cured composition comprising:
   (1) A condensation product of:
      (a) At least 25% by weight of the reaction product of glycerine, ethylene glycol and dimethyl terephthalate,
      (b) Up to 75% by weight of a phenylmethyl silicone of the formula

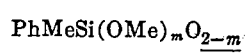
$$PhMeSi(OMe)_mO_{\frac{2-m}{2}}$$

in which m has a value from .01–2, said condensation product (1) containing from .001–3% by weight titanium added as (2) A titanium compound of the group consisting of alkanol amine titanates, alkanol amine titanate N salts, compounds of the formula Ti(OR)$_4$ in which R is of the group consisting of monovalent hydrocarbon radicals, hydroxylated monovalent hydrocarbon radicals, carboxylated monovalent hydrocarbon radicals and acyl radicals of the formula $$-\overset{O}{\overset{\|}{C}}R'$$

in which R' is an aliphatic hydrocarbon radical and organic solvent soluble partial condensates of said titanium compound (2).

4. An article of manufacture comprising an electrical conductor on which the cured coating comprises:
(1) A condensation product of:
(a) At least 25% by weight of the reaction product of a polyhydric alcohol, at least some of which alcohol is at least trihydric, and a compound of the group consisting of terephthalic and isophthalic acids and lower alkyl esters thereof and
(b) Up to 75% by weight of an organosilicon compound of the formula $$R''_nSiX_m O_{\frac{4-n-m}{2}}$$

in which R'' is a monovalent hydrocarbon radical, X is selected from the group consisting of halogen atoms, alkoxy radicals and silicon bonded hydroxyl radicals, hydroxylated monovalent hydrocarbon radicals and radicals of the formula ZOOCB— in which Z is of the group consisting of hydrogen and lower alkyl radicals and B is a divalent hydrocarbon radical, $n$ has an average value from 1-3 inclusive and $m$ has an average value from .01-3 inclusive, said condensation product (1) containing from .001-3% by weight of titanium added as
(2) A titanium compound of the group consisting of of alkanol amine titanates, alkanol amine titanate N salts, compounds of the formula Ti(OR)$_4$ in which R is of the group consisting of monovalent hydrocarbon radicals, hydroxylated monovalent hydrocarbon radicals, carboxylated monovalent hydrocarbon radicals and acyl radicals of the formula $$-\overset{O}{\overset{\|}{C}}R'$$

in which R' is an aliphatic hydrocarbon radical and organic solvent soluble partial condensates of said titanium compound (2).

5. An article of manufacture comprising an electrical conductor on which the cured coating comprises:
(1) A condensation product of:
(a) At least 25% by weight of the reaction product of a polyhydric alcohol, at least some of which alcohol is at least trihydric, and a compound of the group consisting of terephthalic and isophthalic acids and lower alkyl esters thereof and
(b) Up to 75% by weight of a fatty acid, said condensation product (1) containing from .001-3% by weight of titanium added as
(2) A titanium compound of the group consisting of alkanol amine titanates, alkanol amine titanate N salts, compounds of the formula Ti(OR)$_4$ in which R is of the group consisting of monovalent hydrocarbon radicals, hydroxylated monovalent hydrocarbon radicals, carboxylated monovalent hydrocarbon radicals and acyl radicals of the formula $$-\overset{O}{\overset{\|}{C}}R'$$

in which R' is an aliphatic hydrocarbon radical and organic solvent soluble partial condensates of said titanium compound (2).

6. An electrical conductor coated with a cured composition comprising:
(1) The reaction product of glycerine, ethylene glycol and dimethyl terephthalate, said product (1) containing from .001-3% by weight titanium added as
(2) A titanium compound of the group consisting of alkanol amine titanates, alkanol amine titanate N salts, compounds of the formula Ti(OR)$_4$ in which R is of the group consisting of monovalent hydrocarbon radicals, hydroxylated monovalent hydrocarbon radicals, carboxylated monovalent hydrocarbon radicals and acyl radicals of the formula $$-\overset{O}{\overset{\|}{C}}R'$$

in which R' is an aliphatic hydrocarbon radical and organic solvent soluble partial condensates of said titanium compound (2).

References Cited in the file of this patent
UNITED STATES PATENTS

| | | |
|---|---|---|
| 2,686,739 | Kohl | Aug. 17, 1954 |
| 2,686,740 | Goodwin | Aug. 17, 1954 |
| 2,732,320 | Gullissen | Jan. 24, 1956 |
| 2,736,721 | Dexter | Feb. 28, 1956 |

FOREIGN PATENTS

| | | |
|---|---|---|
| 851,846 | Germany | Oct. 9, 1952 |

OTHER REFERENCES

Du Pont Titanium Organics, E. I. du Pont de Nemours and Co., Wilmington 98, Delaware, November 23, 1953.

Chemical and Engineering News, 32, No. 42, October 18, 1954, page 4167.

UNITED STATES PATENT OFFICE

CERTIFICATE OF CORRECTION

Patent No. 2,917,414           December 15, 1959

William M. McLean

It is hereby certified that error appears in the printed specification of the above numbered patent requiring correction and that the said Letters Patent should read as corrected below.

Column 2, lines 59 to 63, the formula should appear as shown below instead of as in the patent:

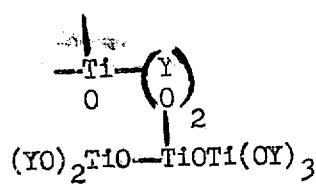

$$(YO)_2TiO-TiOTi(OY)_3$$

column 7, line 66, for "contained" read -- continued --; column 8, line 62, for "ocated" read -- coated --.

Signed and sealed this 24th day of May 1960.

(SEAL)
Attest:
KARL H. AXLINE          ROBERT C. WATSON
Attesting Officer         Commissioner of Patents